A. S. Babbit,
Corn Planter.
No. 110,620. Patented Jan. 3, 1871.
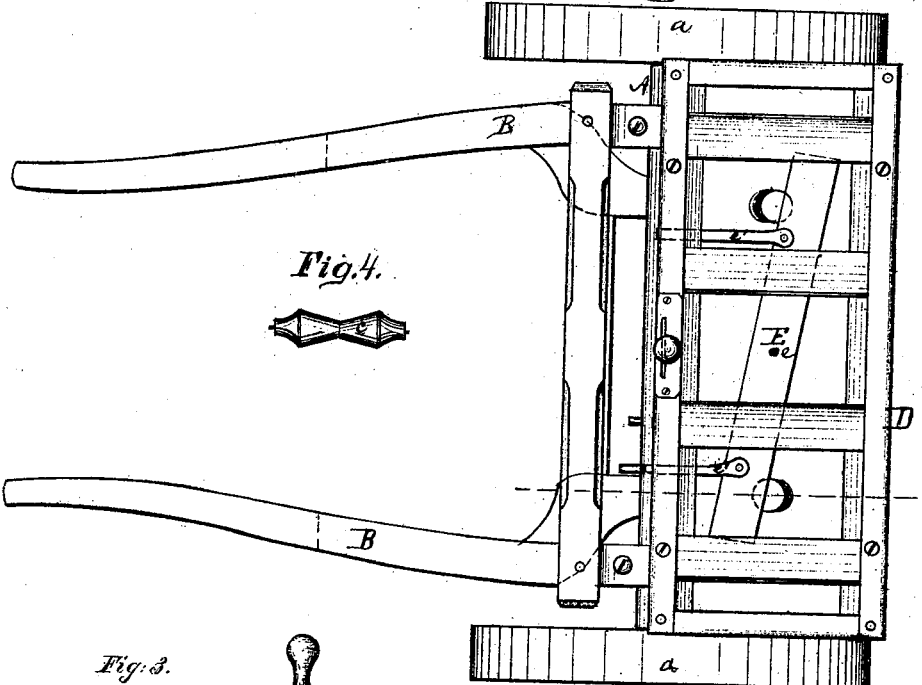
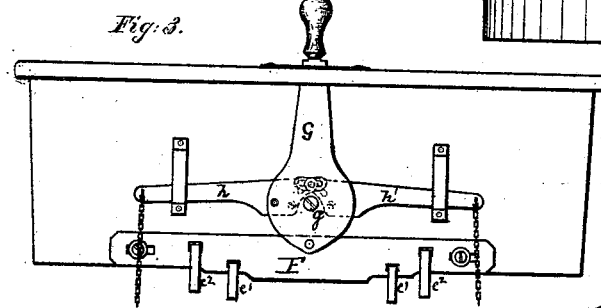
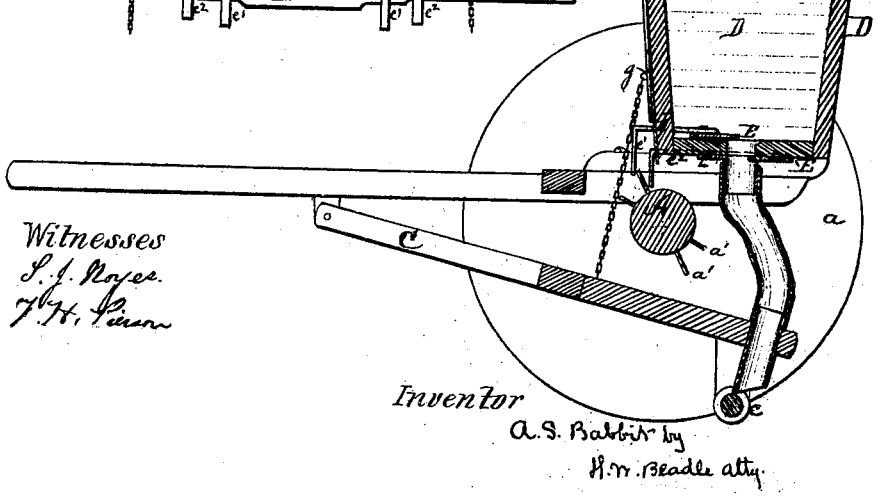
Witnesses
S. J. Noyes
J. H. Pierson
Inventor
A. S. Babbit by
H. W. Beadle atty.

United States Patent Office.

ASHER S. BABBIT, OF KEESEVILLE, NEW YORK, ASSIGNOR TO BABBIT, HINCKLEY, & CO., OF SAME PLACE.

Letters Patent No. 110,620, dated January 3, 1871; antedated December 29, 1870.

IMPROVEMENT IN SEEDING-MACHINES.

The Schedule referred to in these Letters Patent and making part of the same.

*To all whom it may concern:*

Be it known that I, ASHER S. BABBIT, of Keeseville, in the county of Essex and State of New York, have invented a new and useful Improvement in Seeding-Machine; and I do hereby declare that the following is a full and exact description of the same, reference being had to the accompanying drawing and to the letters of reference marked thereon.

This invention relates to that class of seeding-machines which is provided with slides for the purpose of regulating the discharge of the grain from the hopper to the earth, and consists in certain details which will be fully described hereinafter.

Figure 1 is a plan view of my improved seeder;

Figure 2, a vertical transverse section of the same; and

Figure 3, a front elevation of the hopper.

To enable others skilled in the art to make and use my invention, I will now proceed to describe fully its construction and manner of operation.

A represents the axle of the machine, which is supported by the wheels $a$ $a$, one of which is rigidly attached thereto and the other made loose thereon, in the usual well-known manner.

B B represent shafts, which are attached to the axle A, and, extending rearwardly, form supports for the hopper-box D.

C represents drag-bars, the front ends of which are hinged to the shaft, as shown, the rear ends being provided with drill-teeth, in the usual manner.

$c$ represents a covering-roller, which is attached to the rear ends of the drag-bars by means of any suitable connections. Its peculiarity consists in its shape, it being constructed of two cone-frustums united at their small ends.

D represents the hopper, which is divided by partitions, if desired, into any suitable number of compartments, and is provided with suitable orifices in its bottom-board, for the discharge of the seed.

These orifices are provided with inclined edges upon one side, to prevent the seed from being crushed by the movement of the slides.

E E' represent slides, which are similar in their construction and operation, one of which, however, is located above the bottom board, and the other below it. They are suitably pivoted at their centers, as shown at $e$, and are operated by means of arms $e^1$ $e^1$ $e^2$ $e^2$. The rear ends of these arms are attached to the slides near each end, and, extending through the front of the hopper, are bent downward at right angles, as shown.

$a'$ $a'$ represent pins upon the axle A, which are so arranged, relatively to each other and to the bent ends of the arms $e^1$ $e^2$, that, by the revolution of the axle, they are brought into such contact with the arms as to cause the upper and lower slides to open and close alternately with each other.

It will be observed, upon close inspection, that a slide is first opened, or so moved as to uncover the orifices beneath or above it, and then closed again before the other slide moves. This result is accomplished by making the arms of different length, the long arm permitting the slide to turn upon its pivot sufficiently far to uncover the orifice in one direction, while the short arm permits the return movement, but prevents further movement in the other direction.

F represents a plate, which is secured to the front side of the hopper by means of screws passing through slots, as shown. It is provided with suitable orifices, through which pass the arms $e^1$ $e^2$. By means of its slots, the plate is permitted to move longitudinally, being operated, when desired, by means of the lever G. By this movement, the arms $e^1$ $e^2$ are drawn out of the line of movement of the pins upon the axle, and, consequently, when thus moved, the seeding-mechanism is rendered inoperative.

The lever G is pivoted at $g$, and has attached to it arms $h$ $h'$, the former of which is attached thereto, but the latter is pivoted to it and also to the hopper side, as shown in fig. 3.

By means of this construction, the arm $h'$ becomes, in fact, a lever, the short arm of which is moved by arm $h$.

The result of this construction is that the arms $h$ $h'$ are both elevated or depressed by the same movement of the lever.

To the ends of the arms $h$ $h'$ the drag-bars are connected by means of chains.

The lever G is held in position by means of any suitable devices.

The operation is as follows:

The seed is first placed in the hopper, and the mechanism driven to the field, the lever G being, of course, so secured as to hold the seeding mechanism out of gear, and also to elevate the drill-teeth from the ground. When the field is reached, the lever is operated, to loosen the teeth and throw the seeding mechanism into gear. The field is now traversed in the usual manner.

The revolution of the axle causes its pins to engage with the bent ends of the arms attached to the slides, and, consequently, gives the latter the proper movement.

The upper slide is first so moved as to uncover the orifice beneath it and permit the seed to fall therein. It is then moved back to cover the orifice, and the lower slide is opened, and the seed falls into the spouts beneath. The lower slide is then closed and the upper opened, the operation being repeated, of course, indefinitely.

It will be observed that the amount of seed delivered at each discharge is measured by the thickness of the hopper-bottom and the circumference of the orifice.

The seed falling into the furrow is covered by the following roller, which, from its peculiar shape, draws the earth and presses it in a pyramidal ridge immediately over the seed.

If desired, the slides may be operated from either end by means of a cam, in the usual well-known manner.

Having thus fully described my invention,

What I claim as new, and desire to secure by Letters Patent, is—

1. The pivoted slides E E', provided with bent arms $e^1\ e^2$, when arranged above and below a hopper-bottom, having orifices with inclined edges, and operated by means of pins, as described.

2. The lever G, in combination with the arms $h\ h'$ and slide F, as and for the purpose described.

3. The arrangement of the frame A B, drag-bars C, with rollers $c$, hopper D, slides E E', plate F, and lever G, when the parts are constructed as described, for the purpose set forth.

This specification signed and witnessed this 21st day of April, 1870.

ASHER S. BABBIT.

Witnesses:
S. J. NOYES,
EDM. F. BROWN.